Patented Oct. 4, 1938

2,132,191

UNITED STATES PATENT OFFICE 2,132,191

COMPOUND OF THE PYRAZOLOANTHRAQUINONE SERIES

Georg Roesch, Cologne-Muhlheim, Germany, Paul Nawiasky, Summit, N. J., and Karl Saftien, Ludwigshafen-on-the-Rhine, Germany, assignors to General Aniline Works, Inc., New York, N. Y., a corporation of Delaware No Drawing. Application May 25, 1937, Serial No. 144,636. In Germany November 21, 1935

4 Claims. (Cl. 260—312)

The present invention relates to compounds of the pyrazolo-anthraquinone series. This application is a continuation-in-part of our copending application Ser. No. 111,844, filed November 20th, 1936.

We have found that PyC-alkyl-1(N).2-pyrazolo-anthraquinones can be obtained by treating diazonium salts of 1-amino-2-alkyl-anthraquinones in which the alkyl group contains at least two carbon atoms with water or aqueous solutions or by acting on 1-halogen-2-acetyl-anthraquinones with hydrazine.

The diazonium salts serving as initial materials may be prepared in the usual manner, as for example by the action of nitrosyl-sulphuric acid on a solution of the amino-anthraquinone in sulphuric acid. whereby by the addition of water the diazonium salt may frequently be separated and then filtered off by suction.

The conversion of the diazonium salt into the pyrazols is preferably effected by heating their aqueous solutions, but the conversion also proceeds slowly without heating. The solution may be acid, neutral or slightly alkaline. In many cases it is advantageous for the production of good yields to bind the acid set free during the reaction by the addition of alkali carbonates or bicarbonates.

The following examples will further illustrate how the said invention may be carried out in practice but the invention is not restricted to these examples. The parts are by weight.

Example 1

33 parts of concentrated sulphuric acid containing 16 per cent of nitrous acid is added at from 20° to 25° C. to a solution of 25 parts of 1-amino-2-ethylanthraquinone in 250 parts of concentrated sulphuric acid. After stirring for a short time, the mixture is poured onto 750 parts of ice and the deposited diazonium sulphate is filtered off by suction and washed with a little ice water. It is then introduced into a solution of 35 parts of sodium bicarbonate in 1250 parts of water. The liquid is heated to boiling for half an hour and the deposited PyC-methyl - 1(N).2 - pyrazolo-anthraquinone filtered off by suction, washed with water and dried. When recrystallized from nitrobenzene it forms yellow-brown crystals which melt at from 265° to 268° C. and which dissolve in concentrated sulphuric acid giving a yellow-red coloration. The vat is yellow in color. The compound has the following formula:

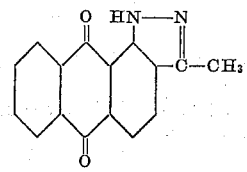

Example 2

13 parts of a concentrated sulphuric acid containing 16 per cent of nitrous acid are added at from 20° to 25° C. to a solution of 10 parts of 1-amino-2-normal-propyl-anthraquinone in 100 parts of concentrated sulphuric acid. After stirring for a short time, the mixture is poured onto 300 parts of ice and the diazonium salt is salted out with common salt, filtered off by suction, washed with a saturated solution of common salt, introduced into a solution of 20 parts of sodium bicarbonate in 500 parts of water and the liquid heated to boiling for half an hour. The deposited PyC-ethyl-1(N).2-pyrazolo-anthraquinone is filtered off by suction, washed and dried. By crystallization from nitrobenzene, yellow-brown crystals are obtained which melt at from 225° to 230° C. The compound has the following formula:

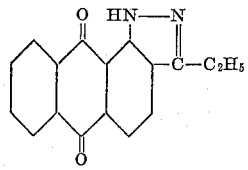

Example 3

80 parts of a concentrated sulphuric acid containing 16 per cent of nitrous acid are added at from 20° to 25° C. to a solution of 57 parts of 1-amino-2-ethyl-4-chloranthraquinone in 400 parts of concentrated sulphuric acid. After allowing to stand for a short time, the mixture is poured into 3000 parts of ice water and the liquid heated to boiling for half an hour. The deposited 4-chlor-PyC-methyl-1(N).2-pyrazolo-anthraquinone is filtered off by suction. When recrystallized from nitrobenzene, it forms brownyellow crystals which melt at from 310° to 312° C. The compound has the following formula:

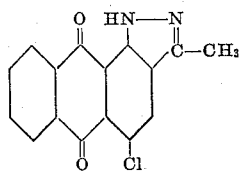

Example 4

15 parts of hydrazine hydrate are added to a solution of 25 parts of 1-chlor-2-acetylanthraquinone, obtainable, for example, from 1-chlor-anthraquinone-2-carboxylic acid chloride and magnesium-malonic acid ester according to the process described in U. S. Patent 2,055,798, in 250 parts of pyridine having a temperature of 70° C. After stirring for an hour at 100° C., the resulting product is filtered off by suction in the cold and washed with methanol. The product obtained is identical to that described in Example 1.

What we claim is:—

1. A pyrazoloanthraquinone corresponding to the general formula

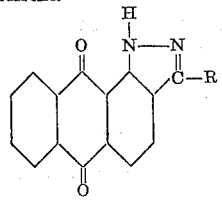

wherein R is a lower alkyl hydrocarbon radical of the paraffin series.

2. The pyrazoloanthraquinone having the formula

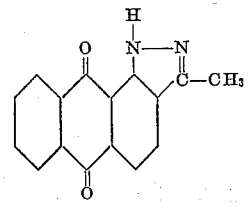

3. The pyrazoloanthraquinone having the formula

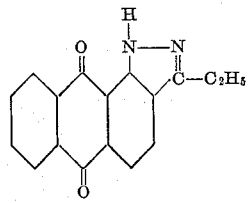

4. The pyrazoloanthraquinone having the formula

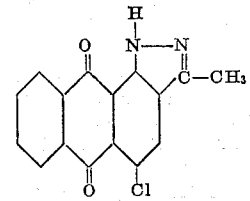

GEORG ROESCH.
PAUL NAWIASKY.
KARL SAFTIEN.